Patented May 18, 1943

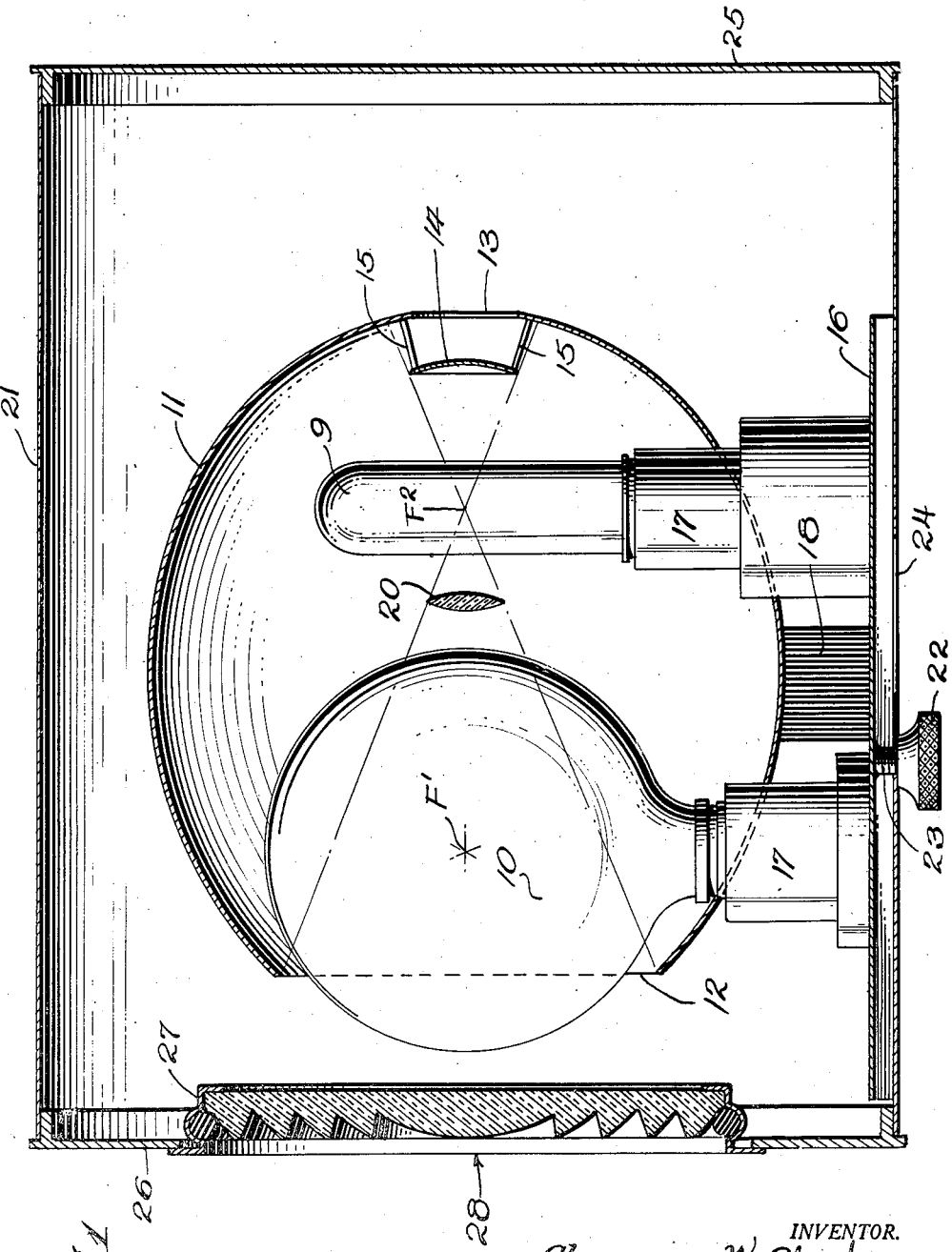

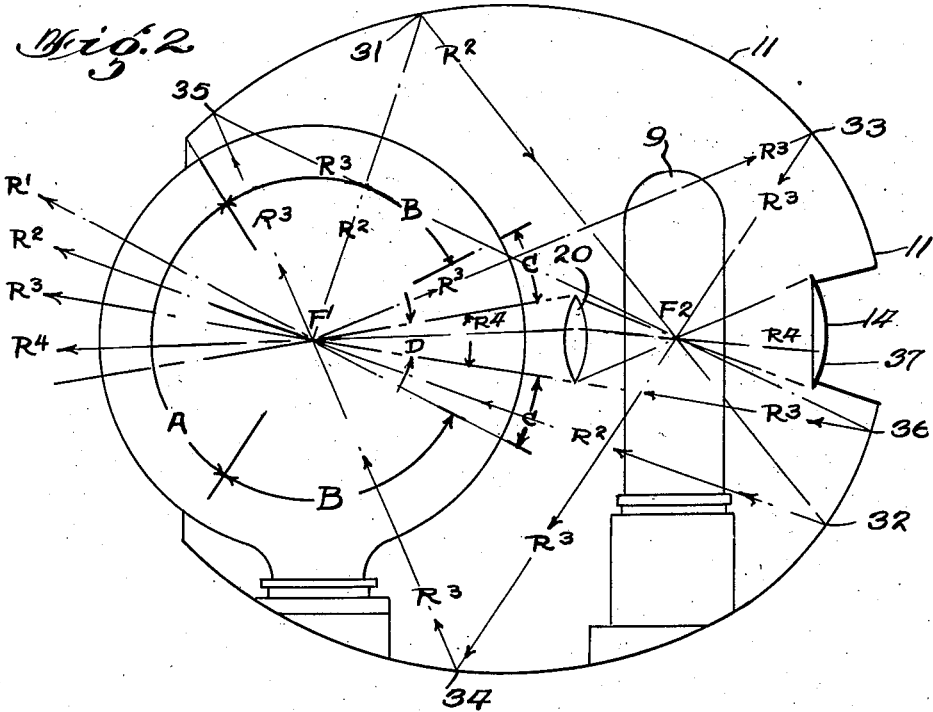
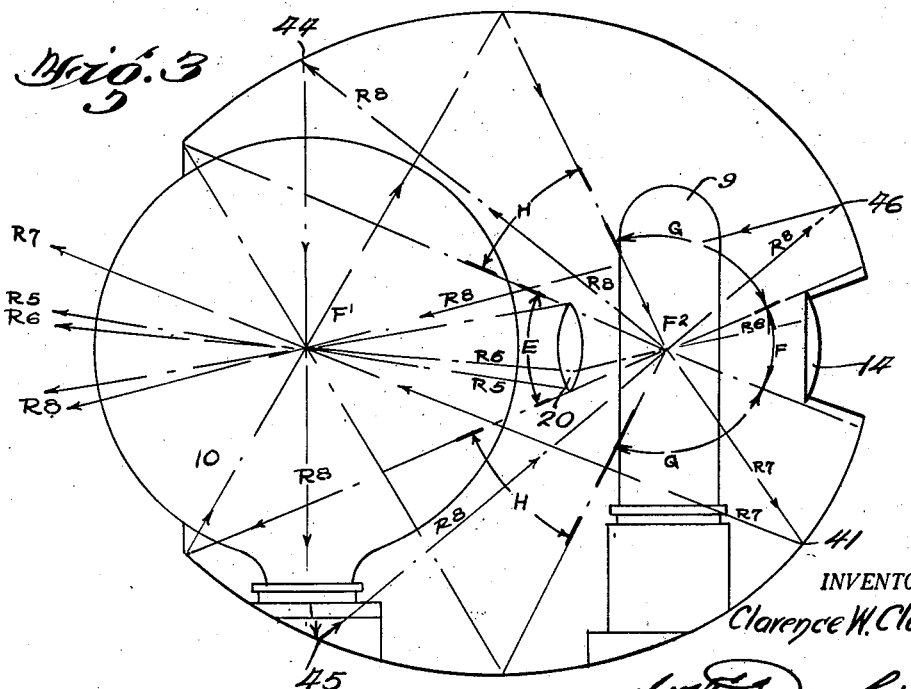

2,319,207

UNITED STATES PATENT OFFICE 2,319,207

COMBINATION MERCURY MAZDA SPOTLIGHT

Clarence W. Clarkson, Washington, D. C.

Application September 25, 1941, Serial No. 412,227

2 Claims. (Cl. 240—1.1)

(Granted under the act of March 3, 1883, as amended April 30, 1928; 370 O. G. 757)

The invention described herein, if patented may be manufactured and used by or for the Government for governmental purposes without the payment of any royalty thereon.

The present invention relates to a novel and improved optical system for spotlights. More specifically, it relates to a light projector wherein the light emitted from two separate sources is concentrated and focused into a single beam.

In the prior art devices known to the inventor at the present time, the ordinary principle of the spotlight has been to concentrate the light rays emitted from a light source by means of a condensing lens. In such constructions, the solid angle of light intercepted by the lens and utilized by the projector has always been very small compared with the total light output of the source, resulting in an inherent inefficiency of operation. In certain instances, spherical reflectors behind the light source have been utilized to reflect an additional portion of the light emitted from the source through the lens after passing through the light source itself, but even in these structures the total area of the lens and reflector have been so small as to constitute a minor part of the entire solid angle surrounding the light source, with the result that the efficiency of the light is very small as compared with the total light output of the lamp.

In cases wherein it has been desired to project a light having particular or specific color characteristics, as, for example, a light having a spectrum comparable with the spectrum of daylight, the result has commonly been accomplished by the use of filters. In lights utilized for color photography wherein the wave lengths of the light are of extreme importance, filters have been used to block certain wave lengths of light and thus approach the desired result by the method of subtracting the unwanted wave lengths from the beam. Such a system, of course, must of necessity result in a still lower efficiency of the light.

Further, it has always been regarded as impracticable to provide an accurate focus for spotlights of more than a comparatively small candle power, since the light source is never an exact point and the large sizes of lamp filaments, for example, are unsatisfactory for use in a spotlight because their comparatively large size results in inherent difficulties of focus so that the rays can never be brought into substantially parallel relationship.

It is therefore the primary object of this invention to provide a novel and improved optical system for spotlights whereby light rays emitted from two separate and independent sources of light may be focused into a single beam of substantially parallel rays.

A further object of the invention is to provide a light projector having two separate and independent light sources wherein substantially all of the light emitted from each of the light sources may be concentrated into a single beam of maximum intensity and capable of controlled focus.

A further object of the invention is to provide a novel and improved optical system for light projectors wherein light emitted from two separate and independent light sources of different color characteristics or light wave lengths, may be combined and focused into a single beam, to the end that color corrections may be accomplished by the addition of light rays having the desired corrective characteristics to the light projected by a single light source, in contrast with methods of color correction wherein the unwanted light frequencies are excluded from the beam or absorbed by filters.

A further object of the invention is to provide a new and novel method of color correction for spotlight beams wherein the color correction is accomplished by the additive method, by utilizing a pair of light sources having different color characteristics and combining the light emitted from said sources into a single beam, as contrasted with color correction by any subtractive method of absorbing undesirable frequencies of light from the beam by filters or other means.

The above and other important objects are accomplished by the structure herein disclosed and described, which constitutes in general an improved optical system, including a primary light source, and elliptical reflector, and a secondary light source, so arranged that the light emitted from each of the light sources is reflected through a sequence of multiple reflections within the elliptical reflector and is finally redirected through the center of the primary light source so that the beam projected by the primary light source is intensified by the light emitted from the secondary light source. In cases where color correction is desired, light sources of different frequencies are utilized so that the resultant beam will represent the sum of the frequencies of both sources. Thus the inherent color deficiencies of any type of light source may be completely corrected without the use of filters or other subtractive means.

Referring now particularly to the drawings, Fig. 1 is a central sectional view of a typical spotlight constructed in accordance with the teachings of this disclosure.

Fig. 2 is a diagrammatic illustration of the optical system of the spotlight with reference to the light rays emanating from the primary light source.

Fig. 3 is a diagrammatic illustration of the optical system, illustrating the method of reflecting and focusing the light rays emanating from the secondary light source.

The primary light source 10, illustrated as an incandescent lamp, is positioned so that the center of its filament lies at one of the foci $F^1$ of an elliptical reflector 11. A secondary light source 9, illustrated as a mercury vapor lamp, is positioned at the other foci $F^2$. The interior surface of the reflector 11 consists of a highly polished reflecting surface formed in a true elliptical shape about the foci $F^1$ and $F^2$. An aperture 12 is provided at the forward end of the reflector and is concentric with the axis of the foci $F^1$ and $F^2$, it being understood, of course, that the reflector 11 is circular in transverse cross-section so that all points of the reflector are concentric with a line through the foci $F^1$ and $F^2$ so that these points constitute primary and secondary focal points of the reflector. A ventilating aperture 13 is provided at the opposite end of the reflector 11, and a spherical reflector 14 is mounted on brackets 15 to intercept all rays of light falling in the rearmost area of the reflector. The reflector 14 is positioned with its center of curvature coincident with the focal point $F^2$ for reasons to be hereinafter pointed out. A small condensing lens 20 is positioned between the primary and secondary light sources and supported by any suitable type of bracket (not shown), and has a focal length such that light emitted from the point $F^1$ will be concentrated on the point $F^2$ and vice versa.

The entire assembly of the light sources 9 and 10, the lens 20, and reflector 11 are mounted on a base 16 by means of sockets 17 and the bracket 18. The base 16 is arranged for longitudinal sliding movement within the housing 21 by hand knob 22 threaded on a clamping screw 23 adapted to slide in a focusing slot 24 at the bottom of the housing. The casting 25 closes the rear of the housing, while a casting 26 which closes the front of the housing is provided with a flange 27 in which a condensing lens 28 is mounted.

The operation of the primary optical system of the device is as follows:

When the filament of the light source 10 is energized, light rays will be emitted in all directions from the point $F^1$ so that all rays falling in certain portions of the solid angle surrounding the light source will be intercepted by the reflector 11, but all rays included within the angle "A" will be emitted through the aperture 12. These will directly impinge the condensing lens 28 to be focused into a beam, which we may designate as a simple or primary beam. The path of a typical ray of light of this beam is indicated in the drawings by the reference numerals $R^1$, which shows the ray directly emitted from the point $F^1$ passing outwardly through the condensing lens. The condensing lens 10 concentrates the numerous rays to form a substantially cone-shaped beam, but it will be understood, of course, that as the focusing knob 22 is moved rearwardly, the rays designated by the numeral $R^1$ will approach parallelism until, when the center of the light source 10 reaches the center of focus of the lens 28, all of the rays $R^1$ will be concentrated into a spotlight beam of substantially parallel rays.

All of the rays from the source $F^1$ which are emitted within the spherical angle "B" indicated in the drawings will impinge the interior surface of the elliptical reflector 11 and will be reflected twice, finally being redirected again through the point $F^1$ and outwardly through the aperture 12 to intensify the primary beam heretofore described. The path of a typical ray falling within this angle is illustrated in the drawings by the lines $R^2$, which show the ray first directed upwardly to impinge the reflector 11 at the point 31, thence directed downwardly through the focus $F^2$ to impinge the reflector again at the point 32 and thence be reflected again through the focal point $F^1$ and outwardly through the condensing lens 28. Inasmuch as the ray passes directly through the focal point $F^1$ immediately before impinging the lens, it possesses the same optical characteristics and may be focused in a manner identical with rays originally emitted from the light source. The rays emitted within the solid angle "B" will thus serve to intensify the primary beam and may be focused as a part of the primary beam.

All rays of light emitted from the source 10 within the spherical angle designated as "C" in the drawings will be reflected on the interior surfaces of the elliptical reflector 11 four times before being emitted from the aperture 12, but when so reflected will be directed through the focal point $F^1$, immediately before impinging the condensing lens 28 and will thus also intensify and form a part of the beams heretofore described. A typical path of one of the rays falling within the angle "C" is designated by the line $R^3$ wherein the ray impinges the reflector 11 at the points 33, passes through the foci $F^2$ to the point 34, thence through the foci $F^1$ to the point 35, thence through the foci $F^2$ to the point 36, and finally through the light source 10 on the focal point $F^1$ and outwardly through the condensing lens 28.

All of the light rays included within the angle "D" will impinge on the lens 20 which will act to condense the rays and focus them on the point $F^2$ which is coincident with the center of the secondary light source 9. The rays will continue through the point $F^2$, however, and impinge the spherical reflector 14 which is formed with its center of curvature coincident with the point $F^2$ so that each ray will be reflected directly backwardly through the point $F^2$, the lens 20 and the point $F^1$ and thence outwardly through the condensing lens 28. The path of a typical ray included within the angle "D" is illustrated in Fig. 2 of the drawings by the line $R^4$.

From the foregoing it will be apparent that the primary optical system of the device will focus substantially all of the light emitted from the source 10 into a beam of parallel rays. This beam will be further intensified, however, by the light emitted from the secondary light source 9. Further, since the wave lengths of the light emitted from the secondary source 9 are different from those emitted by the primary source, lamps with known characteristics may be selected for each source so that each source supplies an excess of certain light frequencies inherently deficient in the other.

The operation of the secondary optical system is as follows:

The light emitted from the secondary light source 9 is focused and concentrated through the point $F^1$ and thence outwardly through the condensing lens 28, as a part of the primary beam, as diagrammatically illustrated in Fig. 3.

It will be noted from the illustration that the entire solid angle surrounding the point $F^2$, which is coincident with the center of the light source 9, is divided into four angles, namely, the angles E, F, G and H. All of the rays emitted from the secondary source that are included within the angle E directly impinge the lens 20 and will be focused through the point $F^1$ and thence through the condensing lens 28. This function is illustrated in Fig. 3 by the line $R^5$, where it will be seen that a light emanating from the secondary source 9 at the point $F^2$ will first impinge the lens 20 to be directed through the primary source 10 and the point $F^1$ and thence outwardly through the condensing lens 28.

All rays of light included within the angle F will impinge the spherical reflector 14, as illustrated, for example, by the line $R^6$, and will be redirected through the focal point $F^2$, the lens 20, the focal point $F^1$, and thence outwardly through the condensing lens.

All rays of light emitted from the secondary source 9 and included within the angle G will be reflected from the surface of the elliptical reflector 11, and will be redirected through the light source 10 and focal point $F^1$ and thence outwardly through the condensing lens.

This function is illustrated by the line $R^7$ in Fig. 3. It will be apparent from an examination of the line $R^7$ that the rays included within the angle G will first impinge the reflector 11 at some point such as the point 41, and will be redirected through the primary light source 10 and focus $F^1$, and thence outwardly through the aperture 12 and condensing lens 28.

The rays of light included within the angle H are represented in the drawings by the line $R^8$. By examination of the course of this line it will be seen that the rays are first reflected from the elliptical reflector 11 at the point 44 and directed through the focal point $F^1$ to the point 45 on the elliptical reflector, thence through the focal point $F^2$ to the point 46, thence through the focal point $F^1$ at the center of the primary light source 10 and out through the condensing lens 28.

From an examination of the optical system illustrated in Fig. 3, it will be apparent that all of the rays of the secondary light source 9 are reflected or refracted in such a manner as to be eventually emitted from the aperture 12 of the elliptical reflector 11. However, in every instance, the rays emitted from the aperture 12 have been directed through the focal center $F^1$, which corresponds exactly with the center of the primary light source 10. Thus, the rays emanating from the secondary light source correspond in direction exactly with the rays emitted from the primary light source, and, when they impinge the condensing lens 28 will be refracted to be incorporated as an integral part of the primary light beam. However, inasmuch as the frequency characteristics of the primary and secondary sources may be different, each will supplement the other to provide frequencies deficient in the primary beam and thus accomplish perfect light correction by the complete utilization of all of the light generated in the light sources.

As heretofore pointed out, this method of color correction is additive, in that it utilizes all of the light produced and is therefore of high efficiency. This is in sharp contrast with methods of color correction using filters or other means tending to block out or absorb undesired frequencies and thus accomplish the color correction only by subtracting some of the light generated, since any such system must of necessity reduce the inherent efficiency of the device.

Further, it will be seen that by practicing the teachings of this invention it is possible to provide a spotlight beam of unusually high intensity, since the rays emitted from two separate sources may be concentrated and focused through the primary source to intensify the primary beam with the full amount of light emitted from the secondary source, this being accomplished without requiring any enlargement or any increase in dimensions of the filament of the primary light source.

A present preferred embodiment of the invention has been illustrated in accordance with the patent statutes, but numerous modifications and variations are possible without departing from the teachings of the foregoing specification, and the scope of the invention should therefore be understood to be limited only by the language of the following claims.

Having thus described the invention, what is claimed as new and desired to secure by Letters Patent is:

1. In a light projector, in combination, an elliptical reflector having smooth polished interior light-reflecting surfaces and including a light-projecting aperture at the front end of said reflector; said aperture being concentric with the axis of projection of the beam, the arrangement being such that the two foci of the elliptical reflector lie in substantial spaced relationship with each other on the said axis of projection, the projection aperture being positioned forwardly of both of said foci; a spherical reflecting surface at the rear end of the elliptical reflector and opposite from the projection aperture, said spherical reflector being of smaller diameter than the projection aperture and arranged to subtend a solid angle with respect to the rear foci of the elliptical reflector opposite and equal to the angle subtended by the projection aperture with respect to the rear foci; a primary light source comprising an incandescent lamp located at the front focus of the elliptical reflector, a secondary light source comprising a mercury vapor lamp located at the rear focus of the elliptical reflector, a condensing lens positioned exteriorly of and in front of the light sources and spaced apart from said aperture, the lens being co-axial with the light sources, the elliptical reflector and the spherical reflector; a secondary condensing lens interposed between the primary light source and the secondary light source, said lens being of a focal length to focus rays emitted from either foci upon the other; common mounting means to maintain the light sources, spherical reflector, secondary condensing lens, and elliptical reflector in fixed relative positions with respect to each other, and adapted to simultaneously shift the light source, the spherical reflector, secondary condensing lens, and the elliptical reflector with respect to the condensing lens, to alter the optical characteristics of the projected light beam.

2. In a light projector, in combination, an elliptical reflector having smooth polished interior light-reflecting surfaces and including a light-projecting aperture at the front end of said reflector, said aperture being concentric with the axis of projection of the beam, the arrangement being such that the two foci of the elliptical reflector lie in substantial spaced relationship with each other on the said axis of projection, the projection aperture being positioned forwardly of both of said foci; a spherical reflecting surface at the rear end of the elliptical reflector and opposite from the projection aperture, said spherical reflector being of smaller diameter than the projection aperture and arranged to subtend a solid angle with respect to the rear foci of the elliptical reflector opposite and equal to the angle subtended by the projection aperture with respect to the rear foci; a primary light source located at the front focus of the elliptical reflector, a secondary light source located at the rear focus of the elliptical reflector, a condensing lens positioned in front of the light sources and spaced apart from said sources, the lens being co-axial with the light sources, the elliptical reflector and the spherical reflector; and common mounting means to maintain the light sources, spherical reflector, and elliptical reflector in fixed relative positions with respect to each other, and adapted to simultaneously shift the light sources, the spherical reflector, and the elliptical reflector with respect to the condensing lens, to alter the optical characteristics of the projected light beam.

CLARENCE W. CLARKSON.